United States Patent
Soyama et al.

(10) Patent No.: US 8,951,324 B2
(45) Date of Patent: Feb. 10, 2015

(54) AIR FILTER MEDIUM

(75) Inventors: Toshihiko Soyama, Nagaoka (JP); Hiroshi Kuwano, Nagaoka (JP)

(73) Assignee: Hokuetsu Kishu Paper Co. Ltd., Nagaoka-Shi, Niigata (JP)

( * ) Notice: Subject to any disclaimer, the term of this patent is extended or adjusted under 35 U.S.C. 154(b) by 588 days.

(21) Appl. No.: 13/102,575

(22) Filed: May 6, 2011

(65) Prior Publication Data

US 2011/0283671 A1 Nov. 24, 2011

Related U.S. Application Data

(63) Continuation-in-part of application No. 12/462,997, filed on Aug. 12, 2009, now abandoned, which is a continuation of application No. PCT/JP2009/001259, filed on Mar. 23, 2009.

(30) Foreign Application Priority Data

Mar. 25, 2008 (JP) .................. 2008-078350

(51) Int. Cl.
| | |
|---|---|
| *B01D 39/14* | (2006.01) |
| *B01D 39/20* | (2006.01) |
| *D04H 1/4218* | (2012.01) |
| *D04H 13/00* | (2006.01) |
| *D21H 13/40* | (2006.01) |
| *D21H 27/08* | (2006.01) |

(52) U.S. Cl.
CPC .......... *B01D 39/2024* (2013.01); *D04H 1/4218* (2013.01); *D04H 13/008* (2013.01); *D21H 13/40* (2013.01); *D21H 27/08* (2013.01)
USPC ................. 55/524; 55/522; 55/527; 442/180; 442/331

(58) Field of Classification Search
USPC ........................ 442/180, 331, 348, 355, 367; 55/522–528
See application file for complete search history.

(56) References Cited

U.S. PATENT DOCUMENTS

2006/0242933 A1* 11/2006 Webb et al. .................... 55/486

FOREIGN PATENT DOCUMENTS

| JP | 2003-71219 | 3/2003 |
|---|---|---|
| JP | 2004-154672 | 6/2004 |
| JP | 2006-037339 | 2/2006 |
| JP | 2007-029916 | 2/2007 |

\* cited by examiner

*Primary Examiner* — Thomas McKenzie
(74) *Attorney, Agent, or Firm* — McCarter & English, LLP

(57) ABSTRACT

The objective of the present invention is to provide an air filter medium having a lower pressure drop and higher efficiency as compared to an air filter medium currently in use. This objective is achieved by providing an air filter medium characterized by comprising glass short fibers as its main fibers in which the constituent fibers are dispersed uniformly and, when the constituting fibers at a diluted concentration of 0.04% by mass are allowed to stand for 12 hours, the sedimentation volume is 450 cm$^3$/g or greater.

2 Claims, No Drawings

AIR FILTER MEDIUM

INCORPORATION BY REFERENCE

This application is a continuation-in-part application of U.S. Ser. No. 12/462,997 filed on Aug. 12, 2009 now abandoned. U.S. Ser. No. 12/462,997 is a continuation application of International Application No. PCT/JP2009/001259 filed Mar. 23, 2009, which in turn claims priority from Japanese Patent Application No. JP2008-078350 filed on Mar. 25, 2008. All applications are incorporated herein by reference in entirety.

TECHNICAL FIELD

The present invention is an air filter medium, more specifically, a sub high efficiency or high efficiency air filter medium used for cleanrooms, cleanbenches, etc. in connection with the semiconductor, liquid crystal display, and biological/food industries or building air conditioning filters, air purifier application, etc. so as to filter particles in air.

BACKGROUND TECHNOLOGY

Conventionally, the air filter particle collection technology is used to efficiently collect particles on a submicron or micron unit. Depending on the targeted particle size and particle collection efficiency, air filters can be classified roughly into the following categories: Coarse particle filters; ASHRAE filters; sub high efficiency filters; and high efficiency filters (HEPA filters, ULPA filters). Among these filters, sub high efficiency filters and high efficiency filters have a European standard, namely EN1822. There are seven classes in EN1822 from U16 through H10 according to the collection efficiency level of the most penetrating particle size (MPPS). There are also other high efficiency filter standards such as IEST-RP-CC001 (USA), JIS Z 4812 (Japan), etc., and the materials used for sub high efficiency filters and high efficiency filters are those that satisfy these air filter standards. As to filter medium materials, nonwoven glass fibers are often used for the production of air filter media. The glass fibers, whose average fiber diameter is in the range of 100 nm (submicrons)~several tens of microns and whose most penetration particle size (MPPS) mentioned above is between 0.1 μm and 0.2 μm, are the main constituent of the filter medium.

Key properties required for the air filter medium, besides collection efficiency, includes pressure drop, which is an indicator of a filter medium's air resistance. In order to increase the collection efficiency of the filter medium, the proportion of small diameter-glass fibers must be increased. However, this causes an increase in pressure drop of the filter medium at the same time. Since a large pressure drop increases the load on suction fan operation, the running costs of power are increased, which is a problem. In view of energy conservation, a reduction in pressure drop in filter media is required. Particularly in recent years, the trend in increasing volumetric airflow for air filters invited a growing demand for mitigating pressure drop and increasing collection efficiency to reduce running costs of fans used in cleanrooms, cleanbenches, etc.

As a means to overcome the problem, a method in which the surface tension of the binder added to a filter medium is reduced by containing silicone resin so as to cancel or reduce the webbed membrane of the binder has been proposed (Patent Documents 1 and 2). However, in recent years, particularly in the field of semiconductors, it was found that the diffusion of a small amount of low molecular siloxane contained in silicone resin into air in a cleanroom caused adverse effects on the yield in the manufacturing of large scale integrated circuits (LSI); this makes the use of silicone resin difficult in itself.

Previously, the present inventors proposed an air filter medium in which a binder and a fluorochemical surfactant, whose minimum surface tension is 20 dyne/cm or less when the surfactant was added to pure water at 25° C., are attached on glass fibers that constituted the filter medium (Patent Document 3). This invention had some effect on solving the above problem. Nevertheless, the attachment of a fluorochemical surfactant enhanced wettability of the binder resin surface, sometimes diminishing the water repellency characteristic of the filter medium. In order to improve this drawback, the present inventors proposed a filter medium on which a polymer dispersion having an average particle size of 100 nm or less and a fluorochemical surfactant having the minimum surface tension of 20 mN/m or less when the surfactant is added to pure water at 25° C. were attached (Patent Document 4). These proposals are limited to the binders to be attached on the filter media.

Moreover, for glass fiber base sheets proposed were a manufacturing method in which glass fibers were deflaked in neutral water, then neutral paper was made by using the water to which an N-alkyl betaine type amphoteric surfactant was added (Patent Document 5), and a manufacturing method in which glass fibers were deflaked in neutral water, then neutral paper was made by using the water to which a non-ionic surfactant of polyethylene glycol fatty acid esters was added (Patent Document 6). However, these methods resulted in low filtering medium strength due to a large amount of residual surfactant contained in the filter medium. Also proposed was another method for making glass fiber filter papers for ultra low penetration air filters comprising 5~15% by weight of glass fibers having a fiber diameter in the range of 0.05~0.2 μm and 95~85% by weight of glass fibers having another diameter (Patent Document 7). Yet, the glass fibers having a diameter in the range of 0.05~0.2 μm were too costly and could not be adopted for commercially acceptable filter media, which was another problem.

Nevertheless, these methods were proposed in view of binders, glass fiber sheet making, and glass fiber blending, while little investigation has been made into properties of glass fibers themselves, the main component of the filter medium.

Patent Document 1: JP 02041499A.
Patent Document 2: JP 02175997 A.
Patent Document 3: JP 10156116 A.
Patent Document 4: JP 2004160361 A.
Patent Document 5: JP 62021899 A.
Patent Document 6: JP 61266700 A.
Patent Document 7: JP 62004418 A.

DISCLOSURE OF THE INVENTION

Problems to be Solved by the Invention

The objective of the present invention is to provide an air filter medium having a lower pressure drop and a higher collection efficiency as compared to an air filter medium currently in use.

Means to Achieve the Objective

This objective is achieved by providing an air filter medium characterized by comprising glass short fibers as its main fibers in which the constituent fibers are dispersed uniformly and, when the constituting fibers at a diluted concentration of 0.04% by mass are allowed to stand for 12 hours, the sedimentation volume is 450 cm³/g or greater. Furthermore, the sedimentation volume of the constituting fibers is used as the average fiber length index thereof.

Effects of the Invention

The air filter medium of the present invention can lower pressure drop and improve efficiency of the air filter medium of conventional technology. It can also improve the strength of the filter medium after a binder is attached thereon.

METHOD FOR CARRYING OUT THE INVENTION

The filters used as the main fibers in the present invention are called short glass fibers. One type may be selected freely from short glass fibers having various diameters according to the requirements for filtering performance and other properties. Short glass fibers are glasswool fibers produced by flame attenuation, rotary spinning, etc., which constitute an essential component to maintain the filter medium's pressure drop at a given value and to obtain appropriate efficiency. Since the smaller the fiber diameter, the larger the efficiency, acquiring a high efficiency filter medium necessitates a blending of ultrafine glass fibers having a fine average diameter. Yet, the finer diameter of the fibers promote too mach pressure drop; therefore, an appropriate fiber diameter which balances the pressure drop must be selected. However, fibers having various fiber diameters may also be blended. Usually, fibers having a diameter of less than 5 μm are used. As to the glass of the glass fibers composition, the majority composition for the air filter application is borosilicate glass, which also includes acid resistant C-glass and non-electrically conductive E-glass (non-alkaline glass), etc. Additionally, in order to prevent boron contamination during semiconductor processing, etc., low boron short glass fibers, silica short glass fibers, etc. may also be used. In the present invention, 5% or more by mass of AR glass chopped fibers which do not contain boron oxide but zirconium oxide is blended in the constituent fibers. Furthermore, as long as the objective of the present invention is achieved without any problem, short glass fibers may be blended with 30% or less by mass of a secondary material (e.g., chopped glass fibers, natural fibers, organic synthetic fibers, etc.) having a fiber diameter of 5 μm or larger, which is larger than short glass fibers. However, the main fibers of the present invention are the fibers that constitute 70% by mass of the total blended raw material fibers.

The present inventors vehemently investigated the correlation between the average fiber length of short glass fibers and the collection characteristics of air filter media and devised the present invention. The average fiber length of the short glass fibers is difficult to control due to the way they are produced, and their lengths are distributed in a wide range. What is more, it is generally believed the short glass fibers have a length to diameter ratio of approximately 500:1~3000:1. Until now, the fiber length has been determined under a microscope. But because the diameters of short glass fibers are finer than other fibers, an accurate and speedy determination has been extremely difficult. Nonetheless, it was found through our investigation that the use of the sedimentation volume method of the present invention allowed the average fiber length data of short glass fibers to be determined indirectly. In other words, as short glass fibers having a specific gravity of approximately 2.5 are dispersed in water and allowed to stand still, the fibers released from water dispersant begins to sediment. However, if the average length of glass fibers is long, fibers hold on to each other or interact with each other in some other way in water, making it difficult for them to sediment. The sedimentation volume of the present invention utilizes this phenomenon to quantify the sedimentation state of short glass fibers after dispersion under a given condition. The numeric value is used as an index of the average fiber length: The higher the numeric value, the longer the average length of short glass fibers is.

The following concrete method was used to determine the sedimentation volume of the present invention: The raw material slurry in which glass fibers were dispersed at room-temperature (23° C.) was collected in fractions, which was then diluted in room-temperature (23° C.) pure water to 0.04% by mass. The diluted slurry was placed in a 250 mL graduated cylinder having an inner diameter of 38 mm and allowed to stand for 12 hours. The sedimentation volume was calculated using the following mathematical formula 2.

[Math 1]

$$\text{Sedimentation volume} \left[\frac{cm^2}{g}\right] = \frac{\text{Raw material sedimentation volume after 12 hours' standing [cm}^2\text{]}}{\text{Solid component of fractioned raw material slurry [g]}} \times 100 \quad (2)$$

Now, the standing time was set to 12 hours because this is the condition in which raw material sedimentation is stabilized to a certain degree. Although, in the present invention, the diluted concentration does not vary the sedimentation volume greatly, but affects it to some degree; therefore, the sedimentation volume is limited to 0.04% by mass. A graduated cylinder with graduations is used as a measuring container in the present invention. However, any container that has a cylindrical shape (e.g. tall beakers, test tubes, etc.) may be used.

The present inventors investigated the relationship between the sedimentation volume and filtering property, namely the PF value, of the filter medium, and newly discovered that the larger the sedimentation volume, the higher the collection performance was. In other words, it was found that the longer the average length of short glass fibers, the higher the PF value was. Particularly, the PF value dramatically improves at a sedimentation volume of 450 cm³/g or greater. The cause of this is not known in detail. However, the following mechanism is conceivable: If the average length of fibers is short, the web of fibers constituting the filter medium is disturbed by the short glass fibers that are taken into voids thereof, resulting in a non-uniform filter medium with diminished filtering performance; in contrast, if the average length of fibers is long, the sedimentation volume becomes 450 cm³/g or greater, which reduces the number of short glass fibers that disturb the web, resulting in a uniform filter medium with enhanced filtering performance. What is more, these fibers allow the average length of fibers to be substantially long, fibers constituting the filter medium are locked into each other well, improving the strength (e.g., tensile strength) of the filter medium after binder is added thereto, which is another effect. The relationship among the sedimentation volume, the filter medium PF value, and the filter medium strength holds not only for 100% by mass of short glass fibers, which are main fibers, but also similarly for 70% or greater by mass of main fibers.

The sedimentation volume of the present invention can be achieved as follows: First, short glass fibers having a long average length is selected. Second, in the disintegration and dispersion processes during filter medium sheet making, short glass fibers should not be broken into pieces to shorten the average length. In view of the first, although there is no particular limit to the average length, it is important to select the best suited manufacturer because the method of manufacturing and conditions adopted by a short glass fiber manufacturer dictate different average fiber length characteristics. Alternatively, a manufacturer may find out the optimal condition through process condition control within the same organization. The second view is particularly important. In other words, even if the optimal short glass fibers are selected according to the first point of view, destruction of fibers no longer allows the original characteristics to be utilized. Fibers can be dispersed by the following methods, for example: (A) Mechanical dispersion by using a pulper, agitator, mixer, beater, or beater with blades (naginata-beater) while stirring fibers in water and (B) water vibration energy dispersion by using an ultrasonic oscillator, etc. The latter is relatively advantageous in view of fiber destruction but requires more time for dispersion than the former; this means that each approach has its own advantages and disadvantages, and the methods cannot be limited to one. Destruction of fibers can be mitigated, for example, by a reduction of the dispersion energy through a reduction of the dispersion time or the number of rotations of an agitator, which, on the other hand; adversely affects dispersion performance of fibers, resulting in a filter medium sheet of a non-uniform web with a lower PF value. An optimal condition must be found for each dispersion method so that the constituting fibers are dispersed uniformly and sedimentation occurs at the sedimentation volume of the present invention or more. Here, the state in which "the constituting fibers are dispersed uniformly" means the state in which after 50 mL of the dispersed raw material slurry is collected and diluted 20 times in a 1 L graduated cylinder in water while shaking, a uniform fiber distribution free from sticking fibers or entangled fibers is observed by visual inspection. For the condition of water to disperse the raw material fibers, it is adjusted with sulfuric acid to be acidic in the pH range of 2~4 to improve dispersion. However, a pH neutral surfactant such as a dispersant may also be used. The desirable raw material solid concentration in the dispersion is 0.2~1.5% by mass. At below 0.2% by mass, the probability of the occurrence of fiber destruction increases; when over 1.5% by mass, fiber dispersion performance deteriorates. More desirable is 0.4~1.0% by mass.

In short glass fibers, particularly low boron short fibers must be handled with care during disintegration and dispersion processes. In other words, low boron short glass fibers, which contain little $B_2O_3$ which reinforces fiber strength, are brittle and susceptible to breakage, necessitating careful handling. Therefore, process conditions must be controlled stringently.

By using the short glass fiber raw material having the sedimentation volume of the present invention for short glass fibers excluding low boron short glass fibers, a no-binder filter medium, which is entirely free from binder, having a PF value of at least 9.9 or greater for 0.1~0.15 µm particles can be produced. Moreover, by using low boron short glass fibers, a filter medium having a PF value of at least 9.0 or greater can also be produced. In the past, when the technology that controls sedimentation volume was not available, filter media having the same as or more than the above-mentioned PF value could not be produced. Particularly low boron short glass fibers had a lower PF value than other short glass fibers, and the filter medium that performs better than this could not be made. It is believed that, as mentioned before, this is because the fibers were brittle and susceptible to breakage and the fiber length was short. However, the glass surface characteristics are different from those of borosilicate glass, which makes it difficult to improve the PF value thereof to the level of borosilicate short glass fibers even with some improvement.

Here, the PF value is limited to that of a no-binder filter medium because the filter property PF value of the air filter medium made by using glass fibers (henceforth may be abbreviated to the "glass fiber filter medium" or simply the "filter medium") is subjected to the effects greatly by organic binder chemicals and additives that are added to enhance the strength of the filter medium. As the organic binder that bonds the intersection between filters forms a film in a web of fibers, more pressure is lost in the filter medium, lowering the PF value. In contrast, the PF value may increase due to organic binder chemicals and additives, or in some cases, the PF value may reach the level of the no-binder filter medium or higher. Nevertheless, since an improvement of the PF value for the no-binder filter medium is expected to raise the standard for the totality of PF value for the filter medium after an organic binder is added, there is a good deal of inevitability in paying attention to the PF value of the no-binder filter medium.

Note that the no-binder PF value can be investigated for the organic binder added-filter medium by using the following method: The organic binder component is removed by sintering the filter medium in a furnace at 450° C. for two hours rendering the near-perfect no-binder state (Some additives vanish at 450° C.). Yet available is another method in which the organic binder component used in a filter medium is eluted by a solvent, for example, hot water, an organic solvent such as toluene, acetone, methyl ethyl ketone, carbon tetrachloride, chloroform, etc, or an ultra critical fluid such as ultra critical carbon dioxide, ultra critical water, etc. In this method, extraction of the organic binder component from the filter medium renders the no-binder state. The sedimentation volume of the present invention can also be determined by dispersing the no-binder filter medium in water in such a way that fibers are not destroyed.

In the case of the no-binder filter medium also, if the wet sheet papermaking condition is not appropriate during sheet making, fibers cannot be distributed uniformly in the web, failing to achieve the above-mentioned PF value. Nonetheless, even a non-uniform sheet can be expected to raise the standard for the PF value by adopting the glass fiber raw material having the sedimentation volume of the present invention.

The organic binder of the present invention is not limited to a particular type. However, widely used are synthetic resins such as acrylic resin, urethane resin, epoxy resin, olefin resin, polyvinyl alcohol resin, etc. Generally, these binder resins in the form of aqueous solution or aqueous emulsion are added to a filter medium by impregnation through immersion, or coating. Moreover, in order to reduce the surface tension of the binder liquid, an acetylene-based or fluorochemical surfactant may also be added thereto. Furthermore, in order to make the filter medium water-repellent, water-repellent agents may be added. Generally, these water-repellent agents, as well as binder resins, are added to the filter medium by immersion or spraying.

Furthermore, in order to remove moisture from the sheet made from the filter medium or from the sheet provided with an organic binder liquid, the sheet is dried preferably at 110~150° C. by using a hot air dryer or roll dryer.

EXAMPLES

Reference Example 1

Acidic water of pH 2.5 with sulfuric acid was added to 90% by mass of borosilicate short glass fibers having an average fiber diameter of 0.65 μm (106-475 manufactured by Johns-Manville Corporation) and 10% by mass of borosilicate short glass fibers having an average fiber diameter of 2.70 μm (110X-475 manufactured by Johns-Manville Corporation) to give a concentration of 0.5% by mass. These raw materials were deflaked for a minute by using a food mixer (Product No. MX-V200 manufactured by Matsushita Electric Industrial; henceforth may be abbreviated simply as the "mixer") while the voltage supplied to the mixer (henceforth abbreviated as the "mixer voltage") was converted from the rated 100V to 70V (actual amperage of 2.9 A) via a transformer. The deflaked dispersion was dispersed uniformly. Then, the deflaked raw materials were diluted to a concentration of 0.1% by mass in the same acidic water and made into a wet sheet of paper by using a handmade sheet molder, followed by drying at 130° C. by using a roll dryer to obtain a filter medium having a basis weight of 70 g/m².

Reference Example 2

As to Reference Example 1, except that the mixer voltage of Reference Example 1 was converted to 60V (actual amperage of 2.9 A), the raw materials were deflaked for a minute in the same manner as in Reference Example 1. The deflaked dispersion was dispersed uniformly. Then, a filter medium having a basis weight of 70 g/m² was obtained in the same manner as in Reference Example 1.

Reference Example 3

As to Reference Example 1, except that the mixer voltage of Reference Example 1 was converted to 50V (actual amperage of 2.8 A), the raw materials were deflaked for a minute in the same manner as in Reference Example 1. The deflaked dispersion was dispersed uniformly. Then, a filter medium having a basis weight of 70 g/m² was obtained in the same manner as in Reference Example 1.

Reference Example 4

Acidic water of pH 2.5 with sulfuric acid was added to 90% by mass of low boron short glass fibers having an average fiber diameter of 0.65 μm (A06F manufactured by Lauscha Fiber International) and 10% by mass of low boron short glass fibers having an average fiber diameter of 2.70 μm (A26F manufactured by Lauscha Fiber International) to give a concentration of 0.5% by mass. These raw materials were deflaked for a minute in a mixer while the voltage supplied to the mixer was converted from the rated 100V to 60V (actual amperage of 3.0 A). The deflaked dispersion was dispersed uniformly. Then, the deflaked raw materials were diluted to a concentration of 0.1% by mass in the same acidic water and made into a wet sheet of paper by using a handmade sheet molder, which was dried at 130° C. by using a roll dryer to obtain a filter medium having a basis weight of 70 g/m².

Reference Example 5

As to Reference Example 4, except that the mixer voltage was converted to 50V (actual amperage of 2.9 A), the raw materials were deflaked for a minute in the same manner as in Reference Example 4. The deflaked dispersion was dispersed uniformly. Then, a filter medium having a basis weight of 70 g/m² was obtained in the same manner as in Reference Example 4.

Reference Example 6

As to Reference Example 1, except that a standard disintegrator was adopted in, place of the mixer, and the raw materials were deflaked by a standard disintegrator (JIS P 8220 enacted in 1998) at a rated voltage of 100V for a minute, the same process as Reference Example 1 was used. The deflaked dispersion was dispersed uniformly. Then, a filter medium having a basis weight of 70 g/m² was obtained in the same manner as in Reference Example 1.

Reference Example 7

As to Reference Example 4, except that a standard disintegrator was adopted in place of the mixer, and the raw materials were deflaked by a standard disintegrator at a rated voltage of 100V for 30 seconds, the same process as Reference Example 4 was used. The deflaked dispersion was dispersed uniformly. Then, a filter medium having a basis weight of 70 g/m' was obtained in the same manner as in Reference Example 4.

Reference Example 8

Borosilicate short glass fibers made by a manufacturer which is different from that of Reference Example 1 was used. Acidic water of pH 2.5 with sulfuric acid was added to 90% by mass of ultra fine glass fibers having an average fiber diameter of 0.65 μm (B06F manufactured by Lauscha Fiber International) and 10% by mass of ultra fine glass fibers having an average fiber diameter of 2.70 μm (B26R manufactured by Lauscha Fiber International) to give a concentration of 0.5% by mass. These raw materials were deflaked for a minute in a mixer while the mixer voltage was converted from the rated 100V to 80V (actual amperage of 2.9 A). The deflaked dispersion was dispersed uniformly. Then, the deflaked raw materials were diluted to a concentration of 0.1% by mass in the same acidic water and made into a wet sheet of paper by using a handmade sheet molder, which was dried at 130° C. by using a roll dryer to obtain a filter medium having a basis weight of 70 g/m².

Reference Example 9

As to Reference Example 8, except that the mixer voltage of 80 V was converted to 70V (actual amperage of 2.9 A), the raw materials were deflaked for a minute in the same manner as in Reference Example 8. The deflaked dispersion was dispersed uniformly. Then, a filter medium having a basis weight of 70 g/m² was obtained in the same manner as in Reference Example 8.

Reference Example 10

In Reference Example 4, acrylic latex (Trade Name: VON-COAT AN-155. Manufacturer: Dainippon Ink and Chemicals, Inc.) and a fluorochemical repellent agent (Trade Name: LIGHT-GUARD T-10. Manufacturer: Kyoeisha Chemical Co., Ltd.) were mixed to make a slurry of binder having a solid component ratio by mass of 100/5. The resulting wet sheet of paper was impregnated therein and dried at 130° C. by using a roll dryer. A filter medium having a basis weight of 70 g/m² and an attached binder amount (solid content) of 5.5% by mass was obtained.

Example 11

Acidic water of pH 2.5 with sulfuric acid was added to 90% by mass of low boron short glass fibers having an average fiber diameter of 0.65 μm (A06F manufactured by Lauscha Fiber International), 5% by mass of low boron short glass fibers having an average fiber diameter of 2.70 μm (A26F manufactured by Lauscha Fiber International) and 5% by mass of AR glass chopped fiber having an average fiber diameter of 13 μm and a fiber length of 6 min (ACS S-750 manufactured by Nippon Electric Glass Co., Ltd.) to give a concentration of 0.5% by mass. These raw materials were deflaked for a minute in a mixer while the voltage supplied to the mixer was converted from the rated 100V to 60V (actual amperage of 3.0 A). The deflaked dispersion was dispersed uniformly. Then, the deflaked raw materials were diluted to a concentration of 0.1% by mass in the same acidic water and made into a wet sheet of paper by using a handmade sheet molder, which was dried at 130° C. by using a roll dryer to obtain a filter medium having a basis weight of 70 g/m$^2$.

Example 12

As to Example 11, except that the mixer voltage was converted to 50V (actual amperage of 2.9 A), the raw materials were deflaked for a minute in the same manner as in Example 11. The deflaked dispersion was dispersed uniformly. Then, a filter medium having a basis weight of 70 g/m$^2$ was obtained in the same manner as in Example 11.

Comparative Example 1

As to Reference Example 1, except that the rated voltage of 100V (actual amperage of 2.9 A) was adopted for the mixer voltage, the raw materials were deflaked for a minute in the same manner as in Reference Example 1. The deflaked dispersion was dispersed uniformly. Then, a filter medium having a basis weight of 70 g/m$^2$ was obtained in the same manner as in Reference Example 1.

Comparative Example 2

As to Reference Example 1, except that the mixer voltage of Reference Example 1 was converted to 80V (actual amperage of 2.9 A), the raw materials were deflaked for a minute in the same manner as in Reference Example 1. The deflaked dispersion was dispersed uniformly. Then, a filter medium having a basis weight of 70 g/m$^2$ was obtained in the same manner as in Reference Example 1.

Comparative Example 3

As to Reference Example 1, except that the mixer voltage was converted to 40V (actual amperage of 2.6 A), the raw materials were deflaked for a minute in the same manner as in Reference Example 1. The deflaked dispersion was dispersed uniformly. Then, a filter medium having a basis weight of 70 g/m$^2$ was obtained in the same manner as in Reference Example 1.

Comparative Example 4

As to Reference Example 4, except that the rated voltage of 100V (actual amperage of 3.0 A) was adopted for the mixer voltage, the raw materials were deflaked for a minute in the same manner as in Reference Example 4. The deflaked dispersion was dispersed uniformly. Then, a filter medium having a basis weight of 70 g/m$^2$ was obtained in the same manner as in Reference Example 4.

Comparative Example 5

As to Reference Example 4, except that the mixer voltage was converted to 70V (actual amperage of 3.0 A), the raw materials were deflaked for a minute in the same manner as in Reference Example 4. The deflaked dispersion was dispersed uniformly. Then, a filter medium having a basis weight of 70 g/m$^2$ was obtained in the same manner as in Reference Example 4.

Comparative Example 6

As to Reference Example 4, except that the mixer voltage was converted to 40V (actual amperage of 2.6 A), the raw materials were deflaked for a minute in the same manner as in Reference Example 4. The deflaked dispersion was dispersed uniformly. Then, a filter medium having a basis weight of 70 g/m$^2$ was obtained in the same manner as in Reference Example 4.

Comparative Example 7

As to Reference Example 1, except that a standard disintegrator was adopted in place of the mixer, and the raw materials were deflaked by using a standard disintegrator at a rated voltage of 100V for two minutes, the same process as Reference Example 1 was used. The deflaked dispersion was dispersed uniformly. Then, a filter medium having a basis weight of 70 g/m$^2$ was obtained in the same manner as in Reference Example 1.

Comparative Example 8

As to Reference Example 4, except that a standard disintegrator was adopted in place of the mixer, and the raw materials were deflaked by using a standard disintegrator at a rated voltage of 100V for a minute, the same process as Reference Example 4 was used. The deflaked dispersion was dispersed uniformly. Then, a filter medium having a basis weight of 70 g/m$^2$ was obtained in the same manner as in Reference Example 4.

Comparative Example 9

Acrylic latex (Trade Name: VONCOAT AN-155. Manufacturer: Dainippon Ink and Chemicals, Inc.) and a fluorochemical repellent agent (Trade Name: LIGHT-GUARD T-10. Manufacturer: Kyoeisha Chemical Co., Ltd.) were mixed to make a binder liquid having a solid component ratio by mass to be 100/5. The resulting liquid was sprayed onto the wet sheet obtained in Comparative Example 5, and then dried at 130° C. by using a roll dryer. A filter medium having a basis weight of 70 g/m$^2$ and an attached binder amount (solid content) of 5.5% by mass was obtained.

Comparative Example 10

Acidic water of pH 2.5 with sulfuric acid was added to 90% by mass of low boron short glass fibers having an average fiber diameter of 0.65 μm (A06F manufactured by Lauscha Fiber International), 10% by mass of low boron short glass fibers having an average fiber diameter of 2.70 μm (A26F manufactured by Lauscha Fiber International) to give a concentration of 0.5% by mass. These raw materials were deflaked for a minute in a mixer while the voltage supplied to the mixer was converted from the rated 100V to 60V (actual amperage of 3.0 A). The deflaked dispersion was dispersed uniformly. Then, the deflaked raw materials were diluted to a concentration of 0.1% by mass in the same acidic water and made into a wet sheet of paper by using a handmade sheet molder, which was dried at 130° C. by using a roll dryer to obtain a filter medium having a basis weight of 70 g/m².

Comparative Example 11

As to Comparative Example 10, except that the mixer voltage was converted to 50V (actual amperage of 2.9 A), the raw materials were deflaked for a minute in the same manner as in Comparative Example 10. The deflaked dispersion was dispersed uniformly. Then, a filter medium having a basis weight of 70 g/m' was obtained in the same manner as in Comparative Example 10.

Comparative Example 12

As to Example 11, except 5% by mass of E glass fiber having an average fiber diameter of 9 μm and a fiber length of 6 mm (CS06JAGP401 manufactured by Asahi Fiber Co., Ltd.) instead of the AR glass chopped fiber was employed, the raw materials were deflaked for a minute in the same manner as in Example 11. The deflaked dispersion was dispersed uniformly. Then, a filter medium having a basis weight of 70 g/m² was obtained in the same manner as in Example 11.

Comparative Example 13

As to Example 11, except that 5% by mass of silica-alumina glass chopped fiber having an average fiber diameter of 9 μm and a fiber length of 6 mm (belCoTex manufactured by BelChem fiber materials GmbH.) instead of the AR glass chopped fiber was employed, the raw materials were deflaked for a minute in the same manner as in Example 11. The deflaked dispersion was dispersed uniformly. Then, a filter medium having a basis weight of 70 g/m² was obtained in the same manner as in Example 11.

The following experiments were carried out for the filter media obtained in the Examples, Reference Examples and Comparative Examples.

(1) Pressure Drop

Utilizing a self-made system, the pressure drop was determined by the use of a micropressure gauge while blowing air to a filter medium having an effective area of 100 cm² at an area wind speed of 5.3 cm/sec.

(2) DOP Efficiency

The upstream to downstream count ratio, namely DOP penetration, was determined by using a laser particle counter manufactured by Lion Corporation: Air containing poly-disperse DOP (dioctyl phthalate) particles generated by a Raskin nozzle was blown through a filter medium having an effective area of a 100 cm² at an area wind speed of 5.3 cm/sec.

Note that the target particles had a diameter in the range of 0.1~0.15 μm. The DOP efficiency (%) was obtained by using the equation: 100–(DOP penetration).

(3) PF Value

The PF value which is the filter performance index of a filter medium was obtained by using the following Mathematical Formula 1: The higher the PF value, the higher the efficiency or the lower the pressure drop is.

$$PF\ \text{Value} = \frac{\log_{10}(1 - \text{efficiency}\ [\%]/100)}{\text{pressure drop}\ [\text{Pa}]/9.81} \times (-100) \quad (1)$$

*The pressure drop in the mathematical formula 1 is determined when air passes the filter medium at a face velocity of 5.3 cm/s (Unit: Pa).

(4) Tensile Strength

Test strips cut out to a size of 1 inch width×130 mm length from a binder-attached filter medium was collected. They were spun stretched by a length of 100 mm at a stretching speed of 15 mm/min by using a constant speed strograph (Strograph M1 manufactured by Toyo Seiki Co., Ltd.).

(5) Sedimentation Volume

This was obtained by the method described in Paragraph 0013.

(6) Dispersion Performance Evaluation

The dispersion performance of the constituting fibers was evaluated as follows: 50 mL of the dispersed raw material slurry was collected and diluted 20 times in a 1 L graduated cylinder in water while shaking, which was subjected to visual inspection. The uniform dispersion condition free from sticking fibers or entangled fibers is considered to be an excellent dispersion performance. "O" represents excellent dispersion performance, and "X" represents poor dispersion performance.

(7) Binder Removal Treatment

The binder component was removed from the binder-attached filter medium which was kept and sintered in an electric furnace at 500° C. for 30 minutes. The pressure drop, DOP efficiency, PG value of the filter medium after binder was removed were determined by the previously described experiments (1), (2), and (3). Moreover, the sedimentation volume of the filter medium after binder was removed was determined in such a way that some area of the removal treated-filter medium was placed in pure water at room temperature (23° C.) for 3 hours to be dispersed in the ultrasonic vibration treatment to obtain a slurry having a concentration of 0.04% by mass Measurements were taken for the slurry by the method described in Paragraph 0013.

(8) Asperity of the Sheet Surface

The asperity of the surface of the manufactured filter medium was subjected to visual inspection. "O" represents a flat and smooth surface, "A" represents a slightly irregular surface, and "X" represents an irregular surface.

The measurement results for the above experiments are shown in Tables 1~5.

Table 1 shows the results for the filter medium produced under the condition in which the mixer voltage was reduced and the number of rotation of the mixer blades was decreased. Between the rated voltage 100V and 80V, the sedimentation volume is low and the PF value level is also low. This is an indication that fibers were broken and shortened due to the high rotation number mixer processing. Under the condition of 70V~50V, the sedimentation volume reaches over 450 cm³/g and the PF value over 9.9, which indicates that a reduction of rotation number reduced the occurrence of fiber breakage, thereby significantly improving filter properties. However, in the 40V condition, the number of rotation is too small, deteriorating fiber dispersion performance and decreasing the PF value, although the sedimentation volume is high.

Table 2 shows an example of low boron short fibers. In the same manner as in the case of borosilicate short glass fibers, a reduction in the number of rotations of the mixer blades provides the sedimentation volume of 450 cm³/g or greater, which improves the PF value to 9 or more. The fact that the deterioration of fiber properties causes the PF value to diminish in the 40V condition is also the same. However, low boron short glass fibers are much more brittle than borosilicate short glass fibers, narrowing the range of suitable number of rotations. Even after an improvement is made, the PF value level is lower than that of borosilicate short glass fibers due to the properties of fibers themselves.

Table 3 shows an example in which a standard disintegrator is used in place of a food mixer. The standard disintegrator, as compared to a mixer, provides different blade shapes and stirring conditions. Nonetheless, the PF value can be improved by using an appropriate disaggregation time to establish the sedimentation volume of 450 cm$^3$/g or greater. Furthermore, the excessively long disaggregation time indicates the advancement of fiber breakage.

Table 4 shows the example in which the same borosilicate glass short fibers of a different manufacturer were used. In Reference Examples 8 and 9, even though the same disaggregation condition as that of Comparative Example 2 was used, the sedimentation volume reached 450 cm$^3$/g or greater and the PF value 9.9 or greater. The average fiber length of the short glass fibers used in Reference Examples 8 and 9 is surmised to be longer than that of the fibers used in Reference Example 1 and Comparative Example 2.

Table 5 shows the example of a binder-attached filter medium which was deflaked under the same condition as Reference Example 4 and Comparative Example 5 in which low boron short glass fibers were used. In any example, the attached binder increases the pressure drop with decreasing the PF value, while maintaining the same rate of decrease. In other words, the filter properties of the no-binder filter medium, which is the base, is reflected to the properties on the binder-attached filter medium. This is supported by the fact that, after the binder is removed, the property values of the no-binder filter medium, namely the sedimentation volume, pressure drop, efficiency, and PF value, are nearly reproduced.

Table 6 shows an example of low boron short fibers. In the same manner as in the case of borosilicate short glass fibers, a reduction in the number of rotations of the mixer blades provides the sedimentation volume of 450 cm$^3$/g or greater, which improves the PF value to 9 or more. The fact that the deterioration of fiber properties causes the PF value to diminish in the 40V condition is also the same. However, low boron short glass fibers are much more brittle than borosilicate short glass fibers, narrowing the range of suitable number of rotations. Even after an improvement is made, the PF value level is lower than that of borosilicate short glass fibers due to the properties of fibers themselves. However, the filter media in which low boron short fibers were employed has a concave-convex surface, and it did not disappear, even if the number of rotations of the mixer blades was increased. The filter media in which the AR glass chopped fiber was blended had a flat and smooth surface. The filter media in which traditional E glass chopped fiber or boron-tree silica-alumina glass chopped fiber was employed does not show the same effect as the AR glass chopped fiber containing filter media. This is a unique effect based on the AR glass chopped fiber.

TABLE 1

|  |  | Reference Example 1 | Reference Example 2 | Reference Example 3 | Comparative Example 1 | Comparative Example 2 | Comparative Example 3 |
|---|---|---|---|---|---|---|---|
| Short glass fibers |  | Borosilicate short glass fibers | Borosilicate short glass fibers | Borosilicate short glass fibers | Borosilicate short glass fibers | Borosilicate short glass fibers | Borosilicate short glass fibers |
| Binder |  | None | None | None | None | None | None |
| Water-repellent |  | None | None | None | None | None | None |
| Attached Binder Amount (solid content) | % by mass | 0 | 0 | 0 | 0 | 0 | 0 |
| Disintegration method |  | Food mixer | Food mixer | Food mixer | Food mixer | Food mixer | Food mixer |
| Disintegration condition |  | Mixer voltage: 70 V | Mixer voltage: 60 V | Mixer voltage: 50 V | Mixer voltage: Rated 100 V | Mixer voltage: 80 V | Mixer voltage: 40 V |
| Disintegration time |  | 1 minute | 1 minute | 1 minute | 1 minute | 1 minute | 1 minute |
| Dispersion evaluation |  | O | O | O | O | O | X |
| Sedimentation volume | cm$^3$/g | 450 | 650 | 875 | 275 | 325 | 950 |
| Pressure drop | Pa | 441 | 435 | 436 | 446 | 441 | 437 |
| 0.1~0.15 μm DOP efficiency | % | 99.9965 | 99.9971 | 99.9967 | 99.9947 | 99.9940 | 99.9892 |
| PF value |  | 9.9 | 10.2 | 10.1 | 9.4 | 9.4 | 8.9 |

TABLE 2

|  |  | Reference Example 1 | Reference Example 4 | Reference Example 5 | Comparative Example 4 | Comparative Example 5 | Comparative Example 6 |
|---|---|---|---|---|---|---|---|
| Short glass fibers |  | Borosilicate short glass fibers | Low boron short glass fibers | Low boron short glass fibers | Low boron short glass fibers | Low boron short glass fibers | Low boron short glass fibers |
| Binder |  | None | None | None | None | None | None |
| Water-repellent |  | None | None | None | None | None | None |
| Attached Binder Amount (solid content) | % by mass | 0 | 0 | 0 | 0 | 0 | 0 |
| Disintegration method |  | Food mixer | Food mixer | Food mixer | Food mixer | Food mixer | Food mixer |
| Disintegration condition |  | Mixer voltage: 70 V | Mixer voltage: 60 V | Mixer voltage: 50 V | Mixer voltage: Rated 100 V | Mixer voltage: 70 V | Mixer voltage: 40 V |
| Disintegration time |  | 1 minute | 1 minute | 1 minute | 1 minute | 1 minute | 1 minute |
| Dispersion evaluation |  | O | O | O | O | O | X |
| Sedimentation volume | cm$^3$/g | 450 | 475 | 700 | 150 | 375 | 825 |
| Pressure drop | Pa | 441 | 445 | 438 | 442 | 436 | 447 |
| 0.1~0.15 μm DOP efficiency | % | 99.9965 | 99.9927 | 99.9932 | 99.9849 | 99.9853 | 99.9755 |
| PF value |  | 9.9 | 9.1 | 9.3 | 8 5 | 8.6 | 7.9 |

TABLE 3

|  |  | Reference Example 1 | Reference Example 6 | Reference Example 4 | Reference Example 7 | Comparative Example 7 | Comparative Example 8 |
| --- | --- | --- | --- | --- | --- | --- | --- |
| Short glass fibers |  | Borosilicate short glass fibers | Borosilicate short glass fibers | Low boron short glass fibers | Low boron short glass fibers | Borosilicate short glass fibers | Low boron short glass fibers |
| Binder |  | None | None | None | None | None | None |
| Water-repellent |  | None | None | None | None | None | None |
| Attached Binder Amount (solid content) | % by mass | 0 | 0 | 0 | 0 | 0 | 0 |
| Disintegration method |  | Food mixer | Standard disaggregation machine | Food mixer | Standard disaggregation machine | Standard disaggregation machine | Standard disaggregation machine |
| Disintegration condition |  | Mixer voltage: 70 V | Voltage: Rated 100 V | Mixer voltage: 60 V | Voltage: Rated 100 V | Voltage: Rated 100 V | Voltage: Rated 100 V |
| Disintegration time |  | 1 minute | 1 minute | 1 minute | 30 seconds | 2 minutes | 1 minute |
| Dispersion evaluation |  | O | O | O | O | O | O |
| Sedimentation volume | cm$^3$/g | 450 | 700 | 475 | 575 | 250 | 150 |
| Pressure drop | Pa | 441 | 442 | 445 | 440 | 437 | 445 |
| 0.1~0.15 μm DOP efficiency | % | 99.9965 | 99.9977 | 99.9927 | 99.9935 | 99.9930 | 99.9871 |
| PF value |  | 9.9 | 10.2 | 9.1 | 9.3 | 9.3 | 8.6 |

TABLE 4

|  |  | Reference Example 1 | Reference Example 8 | Reference Example 9 | Comparative Example 2 |
| --- | --- | --- | --- | --- | --- |
| Short glass fibers |  | Borosilicate short glass fibers | Borosilicate short glass fibers | Borosilicate short glass fibers | Borosilicate short glass fibers |
| Binder |  | None | None | None | None |
| Water-repellent |  | None | None | None | None |
| Attached Binder Amount (solid content) | % by mass | 0 | 0 | 0 | 0 |
| Disintegration method |  | Food mixer | Food mixer | Food mixer | Food mixer |
| Disintegration condition |  | Mixer voltage: 70 V | Mixer voltage: 80 V | Mixer voltage: 70 V | Mixer voltage: 80 V |
| Disintegration time |  | 1 minute | 1 minute | 1 minute | 1 minute |
| Dispersion evaluation |  | O | O | O | O |
| Sedimentation volume | cm$^3$/g | 450 | 650 | 925 | 325 |
| Pressure drop | Pa | 441 | 435 | 436 | 441 |
| 0.1~0.15 μm DOP efficiency | % | 99.9965 | 99.9969 | 99.9970 | 99.9940 |
| PF value |  | 9.9 | 10.1 | 10.2 | 9.4 |

TABLE 5

|  |  | Reference Example 4 | Reference Example 10 | Comparative Example 5 | Comparative Example 9 |
| --- | --- | --- | --- | --- | --- |
| Short glass fibers |  | Low boron short glass fibers | Low boron short glass fibers | Low boron short glass fibers | Low boron short glass fibers |
| Binder |  | None | Present | None | Present |
| Water-repellent |  | None | Present | None | Present |
| Attached Binder Amount (solid content) | % by mass | 0 | 5.5 | 0 | 5.5 |
| Disintegration method |  | Food mixer | Food mixer | Food mixer | Food mixer |
| Disintegration condition |  | Mixer voltage: 60 V | Mixer voltage: 60 V | Mixer voltage: 70 V | Mixer voltage: 70 V |
| Disintegration time |  | 1 minute | 1 minute | 1 minute | 1 minute |
| Dispersion evaluation |  | O | O | O | O |
| Sedimentation volume | cm$^3$/g | 475 | 475 | 375 | 350 |
| Pressure drop | Pa | 445 | 470 | 436 | 464 |
| 0.1~0.15 μm DOP collection efficiency | % | 99.9927 | 99.9946 | 99.9853 | 99.9894 |
| PF value |  | 9.1 | 8.9 | 8.6 | 8.4 |
| Tensile strength (kN/m) | kN/m | — | 0.94 | — | 0.68 |
| Sedimentation volume after binder is removed | cm$^3$/g | — | 450 | — | 375 |
| Pressure drop after binder is removed | Pa | — | 443 | — | 437 |
| 0.1~0.15 μm DOP efficiency after binder is removed | % | — | 99.9921 | — | 99.9852 |
| PF value after binder is removed |  | — | 9.1 | — | 8.6 |

TABLE 6

| | Example 11 | Example 12 | Comparative Example 4 | Comparative Example 5 | Comparative Example 6 |
|---|---|---|---|---|---|
| Short glass fiber | Low boron short glass fiber | Low boron short glass fiber | Low boron short glass fiber | Low boron short glass fiber | Low boron short glass fiber |
| Chopped glass fiber | AR glass fiber (5% by mass) | AR glass fiber (5% by mass) | None | None | None |
| Binder | None | None | None | None | None |
| Water-repellent | None | None | None | None | None |
| Attached Binder Amount (solid content) (% by mass) | 0 | 0 | 0 | 0 | 0 |
| Disintegration method | Food Mixer | Food Mixer | Food Mixer | Food Mixer | Food Mixer |
| Disintegration condition | Mixer voltage 60 V | Mixer voltage 50 V | Mixer voltage 100 V | Mixer voltage 70 V | Mixer voltage 40 V |
| Disintegration time | 1 minute | 1 minute | 1 minute | 1 minute | 1 minute |
| Dispersion evaluation | O | O | O | O | X |
| Sedimentation volume (cm³/g) | 490 | 730 | 150 | 375 | 825 |
| Asperity of the sheet surface | O | O | X | X | O |
| Pressure drop (Pa) | 439 | 441 | 442 | 436 | 447 |
| 0.1-0.15 μm DOP efficiency (%) | 99.9914 | 99.9929 | 99.9849 | 99.9853 | 99.9755 |
| PF value | 9.1 | 9.2 | 8.5 | 8.6 | 7.9 |

| | Comparative Example 10 | Comparative Example 11 | Comparative Example 12 | Comparative Example 13 |
|---|---|---|---|---|
| Short glass fiber | Low boron short glass fiber | Low boron short glass fiber | Low boron short glass fiber | Low boron short glass fiber |
| Chopped glass fiber | None | None | E glass fiber (5% by mass) | silica-alumina glass (5% by mass) |
| Binder | None | None | None | None |
| Water-repellent | None | None | None | None |
| Attached Binder Amount (solid content) (% by mass) | 0 | 0 | 0 | 0 |
| Disintegration method | Food Mixer | Food Mixer | Food Mixer | Food Mixer |
| Disintegration condition | Mixer voltage 60 V | Mixer voltage 50 V | Mixer voltage 60 V | Mixer voltage 60 V |
| Disintegration time | 1 minute | 1 minute | 1 minute | 1 minute |
| Dispersion evaluation | O | O | O | O |
| Sedimentation volume (cm³/g) | 475 | 700 | 510 | 455 |
| Asperity of the sheet surface | Δ-X | Δ | Δ | Δ |
| Pressure drop (Pa) | 445 | 438 | 427 | 439 |
| 0.1-0.15 μm DOP efficiency (%) | 99.9927 | 99.9932 | 99.9905 | 99.9918 |
| PF value | 9.1 | 9.3 | 9.2 | 9.1 |

The invention claimed is:

1. An air filter medium, bonded with an organic binder in the form of aqueous solution or aqueous emulsion, characterized by comprising low boron short glass fibers having <0.09% by weight of $B_2O_3$ as its main fibers in which 5% or more by mass of AR glass chopped fibers is blended, and, the both constituent fibers are dispersed uniformly and, when the constituent fibers at a diluted concentration of 0.04% by mass are allowed to stand for 12 hours, the sedimentation volume is from 450 cm³/g to 730 cm³/g.

2. An air filter medium according to claim 1 wherein said air filter medium in a no-binder condition has a PF value of 9.0 or greater when the PF value is expressed by the following equation (1):

$$PF\ \text{Value} = \frac{\log_{1c}(1 - \text{efficiency [\%]}/100)}{\text{pressure drop [Pa]}/9.81} \times (-100) \quad (1)$$

where the efficiency targets a particle diameter in the range of 0.1-0.15 μm and a face velocity is 5.3 cm/sec.

* * * * *